United States Patent
Feldman et al.

(10) Patent No.: US 7,576,348 B2
(45) Date of Patent: Aug. 18, 2009

(54) ONE-DIMENSIONAL PHASE CONTRAST MICROSCOPY WITH A TRAVELING LENS GENERATED BY A STEP FUNCTION CHANGE

(75) Inventors: Haim Feldman, Nof Ayalon (IL); Doron Meshulach, Ramat-Gan (IL); Eyal Angel, Tel-Aviv (IL)

(73) Assignee: Applied Materials, Israel, Ltd., RehOvot (IL)

( * ) Notice: Subject to any disclaimer, the term of this patent is extended or adjusted under 35 U.S.C. 154(b) by 0 days.

(21) Appl. No.: 11/853,329

(22) Filed: Sep. 11, 2007

(65) Prior Publication Data

US 2008/0116362 A1    May 22, 2008

Related U.S. Application Data

(60) Provisional application No. 60/826,364, filed on Sep. 20, 2006.

(51) Int. Cl.
    *G01N 21/88* (2006.01)
(52) U.S. Cl. ............... 250/559.45; 250/216; 356/237.2; 356/237.5; 348/126
(58) Field of Classification Search ............. 250/214.1, 250/214 R, 208.2, 216, 559.45, 208.1, 559.47–559.49; 356/237.1–237.6; 348/125, 126
    See application file for complete search history.

(56) References Cited

U.S. PATENT DOCUMENTS

| | | | |
|---|---|---|---|
| 3,851,951 A | 12/1974 | Eveleth | |
| 6,808,808 B2 | 10/2004 | Feldman et al. | |
| 6,937,343 B2 | 8/2005 | Feldman | |
| 7,002,695 B2 | 2/2006 | Feldman | |
| 7,092,000 B2 | 8/2006 | Katzir et al. | |
| 2003/0137659 A1* | 7/2003 | Milshtein | 356/237.2 |
| 2004/0080740 A1* | 4/2004 | Feldman et al. | 356/237.2 |
| 2005/0057727 A1 | 3/2005 | Troyer | |
| 2006/0256350 A1 | 11/2006 | Nolte et al. | |

FOREIGN PATENT DOCUMENTS

WO    04/042433    5/2004

OTHER PUBLICATIONS

U.S. Appl. No. 60/826,364 filed Sep. 20, 2006, "One Dimensional Phase Contrast Scanning Microscopy Using an Acousto-Optic Traveling Lens", 7pp.

* cited by examiner

*Primary Examiner*—Georgia Y Epps
*Assistant Examiner*—Francis M Legasse, Jr.
(74) *Attorney, Agent, or Firm*—Tarek N. Fahmi (57) ABSTRACT

A method for imaging a surface includes generating a traveling lens in an acousto-optic material and incorporating a traveling mask into a portion of the traveling lens so as to produce a composite traveling lens. The method further includes irradiating the composite traveling lens so as to produce a composite focused beam having a spatial variation across the composite focused beam. The composite focused beam is directed onto a region of the surface so as to generate radiation characteristic of the region from the region. The radiation is imaged onto a detector so as to generate a signal characteristic of the region, responsively to the spatial variation.

36 Claims, 11 Drawing Sheets

ONE-DIMENSIONAL PHASE CONTRAST MICROSCOPY WITH A TRAVELING LENS GENERATED BY A STEP FUNCTION CHANGE

CROSS-REFERENCE TO RELATED APPLICATIONS

This application is a nonprovisional and claims the priority benefit of U.S. Provisional Patent Application 60/826,364, filed 20 Sep. 2006, which is incorporated herein by reference.

FIELD OF THE INVENTION

The present invention relates generally to microscopy, and specifically to phase contrast microscopy.

BACKGROUND

Phase contrast microscopy was invented in 1935 by Zernike, and enables objects which typically only change the phase of radiation, compared to the surroundings of the object, to be seen. The phase contrast microscope devised by Zernike converts object phase changes into amplitude changes in a final image of the object, thus allowing phase details of the object to be seen. Since its initial invention, there have been a number of systems which claim to have improved microscopy in general, as well as phase contrast microscopy.

U.S. Pat. No. 6,937,343 to Feldman, whose disclosure is incorporated herein by reference, describes a method for optical evaluation of a sample by scanning a beam of coherent radiation over the sample. A frequency shifted reference beam is generated from the scanning beam, and the reference beam is combined with scattered radiation from the sample to generate an optical heterodyne signal characteristic of the sample.

U.S. Pat. No. 7,002,695 to Feldman, whose disclosure is incorporated herein by reference, describes apparatus which includes a source generating a coherent radiation beam, and traveling lens optics which focus the beam to two spots on the surface of a sample. Interference fringes are generated from radiation collected from the two spots, and changes in the fringes may be used to assess optical characteristics of the sample.

U.S. Pat. No. 3,851,951 to Eveleth, whose disclosure is incorporated herein by reference, describes a laser system in which light is focused upon an image plane by interaction with frequency modulated acoustic pulses in a Bragg cell. The light is scanned across the image plane in accordance with the movement of the pulses along the cell.

Published International Patent Application WO 2004/042433 to Rietman et al., whose disclosure is incorporated herein by reference, describes programmable lenses and gratings which are claimed to be of use in a variety of optical applications.

U.S. Patent Application 2006/0256350 to Nolte et al., whose disclosure is incorporated herein by reference, describes apparatus for assessing topology of a surface of a target. The apparatus includes an optical source for generating a probe laser beam, and also includes means for scanning the probe laser beam across at least a portion of the surface of the target.

U.S. Patent Application 2005/0057727 to Troyer, whose disclosure is incorporated herein by reference, describes a laser projection system. The laser beam is modulated using a reflective liquid-crystal light valve.

SUMMARY OF THE INVENTION

In embodiments of the present invention, a scanning microscope includes an acousto-optic (AO) element in which a traveling lens, typically a one-dimensional (1D) traveling lens, is generated. The traveling lens is formed by inputting a radio-frequency (RF) signal to a transducer coupled to the AO element. The RF signal has a varying frequency, and is also termed a chirp. A traveling phase and/or amplitude mask is incorporated into the traveling lens by inserting a corresponding step-function phase change and/or step-function amplitude change into the chirp, and the resulting lens is herein also termed a composite traveling lens. Typically a series of generally similar chirps are input to the transducer, so as to generate a series of generally similar composite traveling lenses in the AO element.

A coherent beam, typically generated with a laser, irradiates each composite traveling lens. The irradiation produces a composite beam having a stepped spatial phase and/or amplitude variation across the beam. The beam thus comprises a phase and/or amplitude changed component (generated by the mask) and an unchanged component. Scanning and illumination optics focus the composite beam onto a region of a surface that is to be imaged, and scan the focused beam across the region. Collection optics collect resulting radiation from the region and convey the radiation, via an exit pupil of the optics, to a detector. An amplitude mask, which has a spatial amplitude variation which is stepped to correspond to the stepped spatial phase and/or amplitude variation of the beam, is positioned at the exit pupil. Radiation from the scanned composite beam that has traversed the amplitude mask combines at the detector to produce amplitude changes corresponding to phase and/or amplitude objects at the region of the surface. A signal generated by the detector in response to the received radiation is thus characteristic of phase and/or amplitude objects at the region.

By using embodiments of the present invention a number of advantages accrue, including:
a. Virtually arbitrary phase shifts and/or amplitude attenuations may be introduced into the composite beam, via corresponding changes in the chirp generating the composite traveling lens.
b. The phase shifts and/or amplitude attenuations may be changed in real-time by changing the RF signal, thereby simplifying optimization of system performance.
c. In cases where the AO element supports more than one traveling lens at the same time, chirps having different phases and/or amplitudes may be applied sequentially so as to cause different composite traveling lenses to be present in the AO element simultaneously.

The scanning microscope may be either a transmission or a reflection microscope. In the latter case some of the optic elements of the microscope may function both as illumination and as collection optics.

The present invention will be more fully understood from the following detailed description of the embodiments thereof, taken together with the drawings, a brief description of which follows.

DETAILED DESCRIPTION

Figure 1:
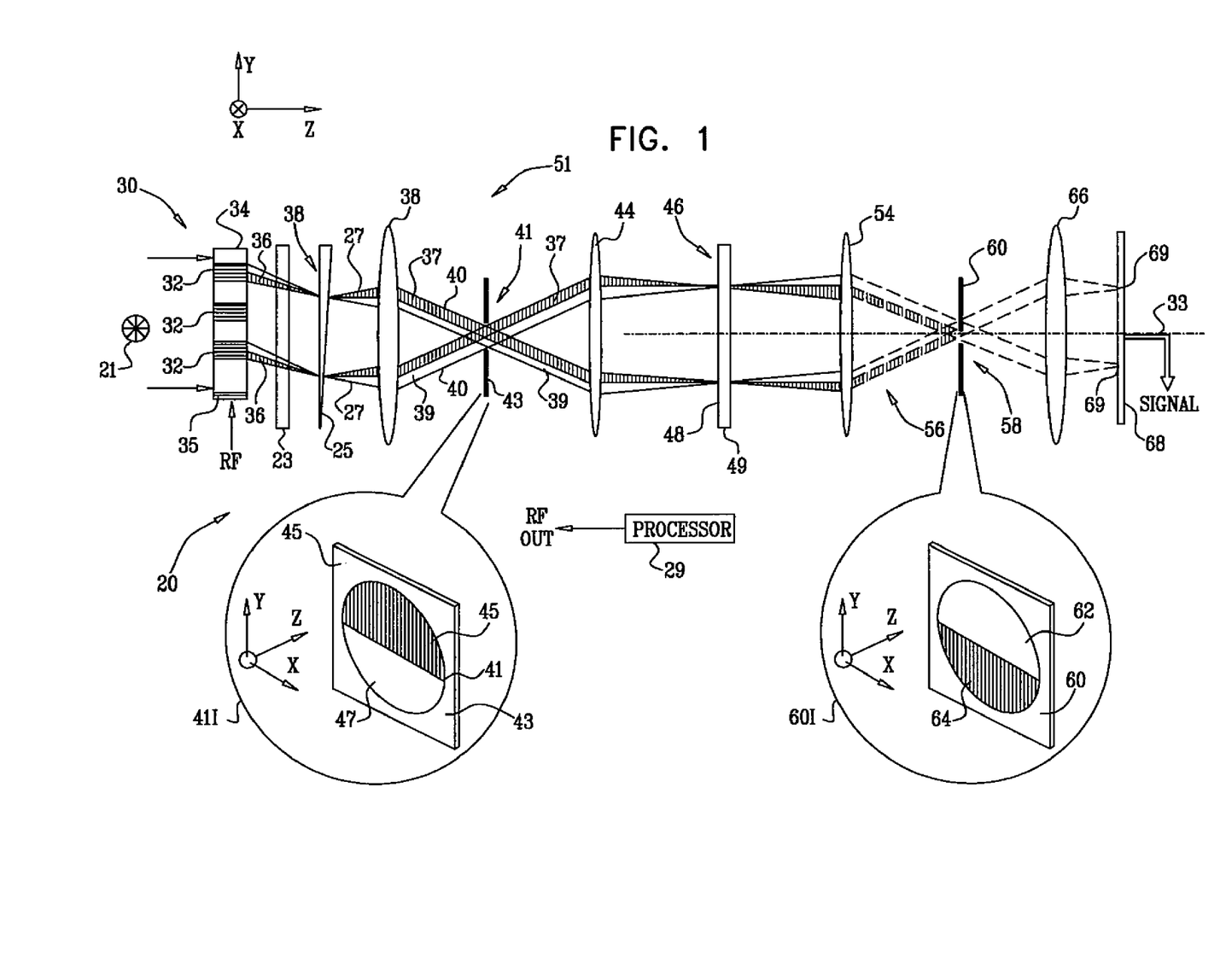
FIG. 1 is a schematic diagram of a transmission scanning microscope, according to an embodiment of the present invention.

Reference is now made to FIG. 1, which is a schematic diagram of a transmission scanning microscope 20, according to an embodiment of the present invention. The following description assumes for clarity that microscope 20 has an optical axis parallel to a z-axis, and that elements of the microscope are typically parallel to an x-y plane. However, microscope 20, as well as its elements, may be configured and/or operated in substantially any orientation. Microscope 20 comprises a radiation source 21, typically a laser, which directs an expanded beam of collimated coherent radiation 30 generally normally to an acousto-optic (AO) element 34. Element 34 is herein assumed to be in the form of a generally rectangular plate oriented in an x-y plane. The expanded beam of radiation is typically produced using a beam expander, not shown in the figure. Typically, source 21 is selected to emit optical radiation at a wavelength in a region of the electromagnetic spectrum between and including far infra-red and deep ultra-violet (DUV), although it will be understood that the principles of the present invention apply equally to other wavelengths of the spectrum. A processor 29, typically incorporating a memory storing operating instructions, drives elements of scanning microscope 20.

Processor 29 generates a radio-frequency (RF) signal, with which it excites a piezoelectric transducer 35 coupled to AO element 34. The RF signal causes transducer 35 to produce groups 32 of substantially similar acoustic waves in element 34, the groups of waves traveling in the y-direction. Hereinbelow, by way of example, transducer 35 is assumed to be a transducer which generates groups 32 as plane waves which have a substantially uniform density in the transverse direction. Three groups 32 are shown in FIG. 1. Each group 32 of traveling waves produces a respective converging composite beam 36, from incident beam 30, two of which composite beams are illustrated in FIG. 1. The RF signal input to transducer 35, and its effect on AO element 34 so as to produce converging focused composite beams 36 from the AO element, are described in more detail below with respect to FIG. 2 and FIG. 3.

Figure 2:
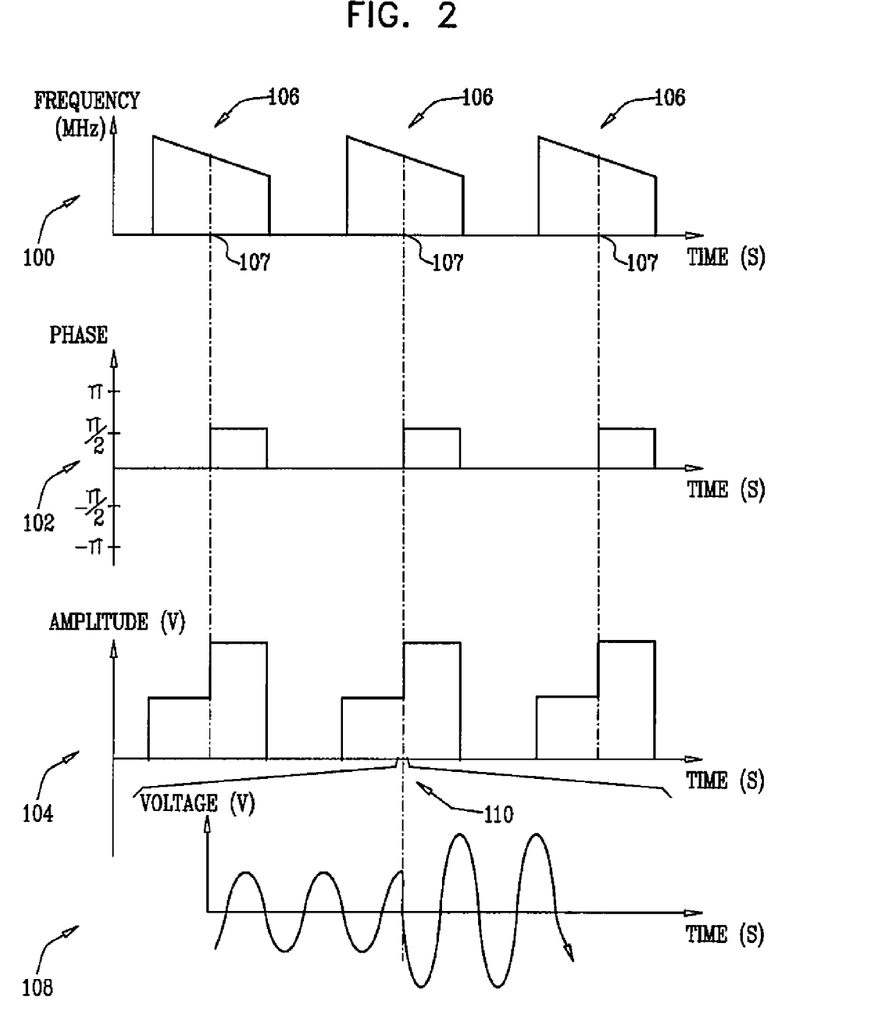
FIG. 2 shows schematic graphs of a radio-frequency signal generated by a processor of the microscope of FIG. 1, according to an embodiment of the present invention.

FIG. 2 shows schematic graphs of the RF signal generated by processor 29, according to an embodiment of the present invention. The RF signal generated by the processor and input to transducer 35 is in the form of pulses 106, or "chirps," each chirp having a variable frequency. Graphs 100, 102, and 104, are respective schematic frequency vs. time, phase vs. time, and amplitude vs. time, graphs of the RF signal. As shown in the graphs, each chirp 106 has a generally linear change of frequency with time. Each chirp also has a stepped phase shift of $$+\frac{\pi}{2}$$

applied to approximately half of the chirp at a temporal midpoint 107 of the chirp, i.e., between the approximate center frequency of the chirp and the final chirp frequency. In the initial half of the chirp, there is no phase shift.

For each chirp there is a stepped change from a first substantially constant attenuated amplitude level to a second substantially constant non-attenuated amplitude level, at substantially the same time as the phase change. The attenuated amplitude level is approximately 50% of the non-attenuated level. It will be understood that the particular relationships and values given for graphs 100, 102, and 104 are by way of illustration, and that the scope of the present invention comprises other relationships and values, such as a non-linear variation of the RF frequency with time, a phase shift that is different from a phase shift of $$+\frac{\pi}{2},$$

and an amplitude change other than a change from a 50% reduction in amplitude. Typically, as for the example shown in FIG. 2, positions of changes in phase and/or amplitude of the chirp are approximately symmetrically disposed with respect to temporal midpoint 107 of chirps 106.

A graph 108 is a schematic voltage vs. time graph of the RF signal, corresponding to a central section 110 of graphs 100, 102, and 104. Graph 108 illustrates the effect of the phase and amplitude changes for a given chirp 106, showing that there is an amplitude change and a phase change at center 107.

Figure 3:
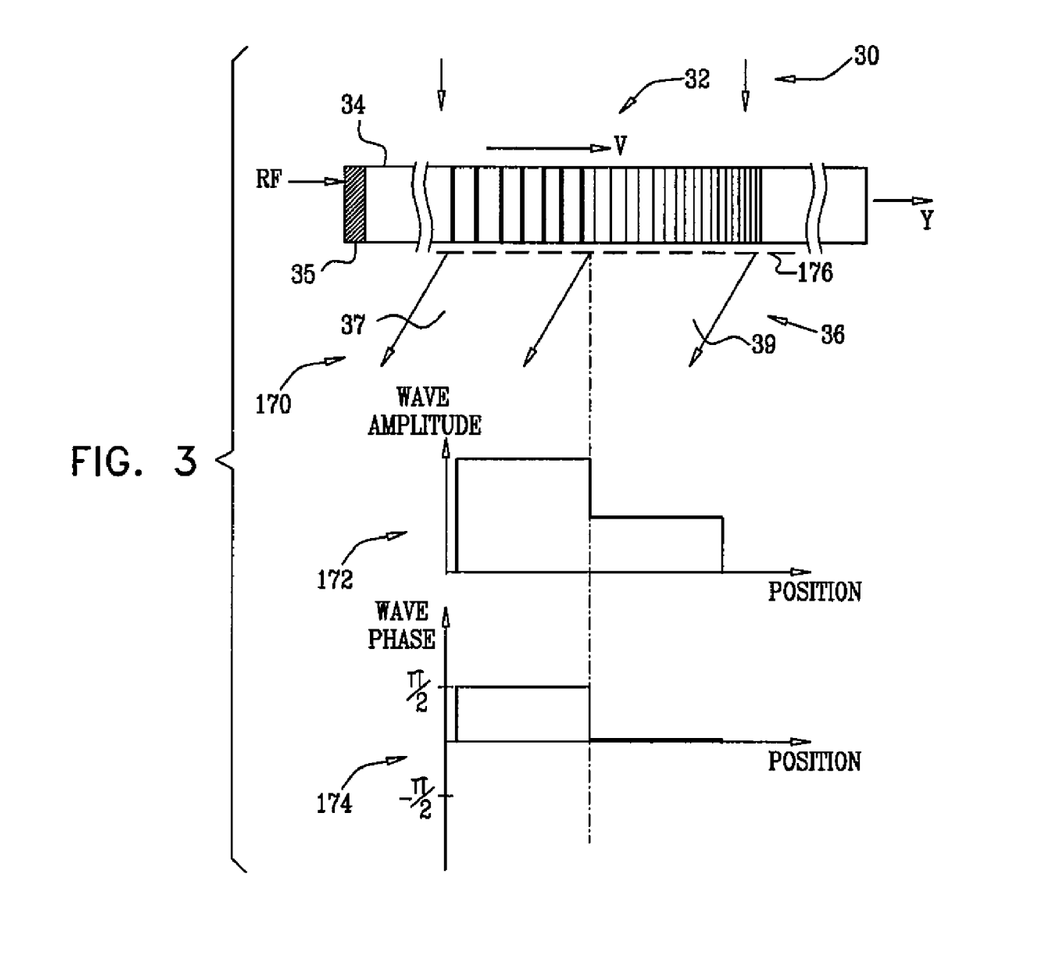
FIG. 3 is a schematic diagram showing the effect of one chirp on an acousto-optic element of the microscope of FIG. 1, according to an embodiment of the present invention.

FIG. 3 is a schematic diagram 170 showing the effect of one chirp 106 on AO element 34, according to an embodiment of the present invention. Diagram 170 illustrates one group 32 of plane acoustic waves produced by one chirp 106, as would be seen at an instant in time. The plane acoustic waves are one-dimensional (1D), having a density variation in the y-direction but substantially no density variation in the x-z plane. Other chirps 106 produce groups of plane acoustic waves which are substantially similar to group 32. The acoustic waves travel parallel to the y-direction in AO element 34 with a speed v, which has a characteristic value for the medium constituting the AO element.

As a consequence of the change of RF frequency of the chirp, the traveling waves produced have a corresponding change of acoustic wavelength along the AO element. Thus, each group 32 of traveling waves acts as a traveling diffraction grating having a variable spacing for incoming beam 30. The variable spacing causes the gratings to deflect sections of the incoming beam by respective different angular values so that each group 32 operates as a cylindrical optical tens, which focuses collimated incoming beam 30 to a convergent beam 36. Furthermore, the phase change within group 32 causes the cylindrical lens to add a corresponding phase change to beam 36, and the amplitude change within the group causes the cylindrical lens to add a corresponding amplitude change to the beam. Thus, each group 32 acts as a traveling cylindrical lens with a traveling amplitude and phase mask, and is herein also termed a 1D composite traveling lens 32.

It will be understood that beams 36 have 1D amplitude and phase changes that correspond to the amplitude and phase changes of the RF signal, since sections of the beams deflect by different angles relative to the y direction, but do not have a characteristic change in either the x or z direction.

Graphs 172 and 174 schematically show the respective amplitude and phase changes across beam 36, measured along a line 176 parallel to the direction in which group 32 is traveling. The amplitude and phase changes across beam 36 effectively divide the beam into two sections, a second section 39 which is phase shifted with respect to a first section 37. In addition second section 39 is attenuated with respect to the first section. 1D beams 36 thus comprise a composition of phase and amplitude changes across the beams, and are also herein termed composite 1D beams 36.

Returning to FIG. 1, the division of composite beams 36 into the two sections 37 and 39 described above is illustrated by shading part of each converging beam 36, the non-shaded part corresponding to attenuated section 39, the shaded part corresponding to phase shifted section 37. As beams 36 traverse elements of microscope 20, phase shift of the beam is indicated by shading, as for section 37, and beam attenuation is indicated by non-shading, as for section 39.

A cylindrical lens 23 focuses converging composite beams 36 from element 34 to a series of focused spots 38, which are approximately collinear, and which travel in the y-direction. A wedge-shaped prism 25, positioned at spots 38, receives the focused beams, and diverts the beams to respective diverging conical beams 27, the axes of each of the conical beams being approximately parallel to axis 33 of microscope 20. A scanning lens 38 converts diverging beams 27 to a series of collimated beams 40 which transfer through a generally circular pupil 41 to an objective 44. Pupil 41 is in an x-y plane, and is fixed relative to beams 40. Optionally, a stop 43 is positioned at pupil 41, the pupil acting as an exit pupil for lens 38, and as an entrance pupil for objective 44.

An inset 41I shows a cross-section of beams 40 at pupil 41. Each beam 40 is divided into two approximate semicircles. An upper semicircle 45 corresponds to sections of collimated beams 40 which are phase shifted, a lower semicircle 47 corresponds to sections of beams 40 which are attenuated. As is shown in the inset, the phase shift and the attenuation both occur in the one-dimensional y direction.

Objective 44 focuses its incident collimated beams to a series of traveling spots 46 on a surface 48, the traveling spots typically traveling along an approximate straight line in the surface. Surface 48 is typically a surface of a transparent element 49, such as a reticle, which is being inspected by transmission microscope 20. Typically, the number of spots 46 on surface 48 at any one time is from approximately three to approximately ten. However, the number of spots may vary from this range; it will be appreciated that the actual number on the surface at any one time is set, inter alia, by the rate of repetition of the RF chirps and the speed of the traveling waves v in AO element 34.

Consideration of FIG. 1, and of the description above, shows that optic elements 23, 25, 38, and 44 act as an optical beam scanning and illumination system 51, and that pupil 41 may be considered as a fixed illumination pupil within the system.

Radiation from spots 46, after traversal of element 49, is collected by collection optics 54, which form the radiation received from the spots into respective collimated beams 56. Beams 56 traverse a fixed exit pupil 58, which is at the focal plane of optics 54.

An amplitude mask 60 is placed at the exit pupil. Mask 60 is configured to have a spatial amplitude variation that corresponds to the spatial phase variation of beams 40, and thus to the spatial phase variation at pupil 41. Both spatial variations are step functions, the steps occurring at the same y-position for the phase variation and for the amplitude variation. An inset 601, illustrating mask 60 in more detail, shows that the mask comprises an upper transparent semicircle 62 and a lower opaque semicircle 64, so that the mask has a change of amplitude in the one-dimensional y direction.

After traversing mask 60, focusing optics 66 focus the received collimated beams onto spots 69 on a detector 68. Detector 68 typically comprises an array of charged coupled detectors (CCDs) or photo-multiplier tubes (PMTs), which generate respective signals according to the intensity of the received radiation. The phase mask introduced into traveling lenses 32, together with the amplitude mask that has also been incorporated into the lenses, when combined with the effect of amplitude mask 60, converts phase changes caused by phase objects on surface 48 to amplitude changes in focused spots 69. Detector 68 generates a signal in response to the amplitude changes, and processor 29 processes the signal to form an image of the phase objects on surface 48.

Figure 4:
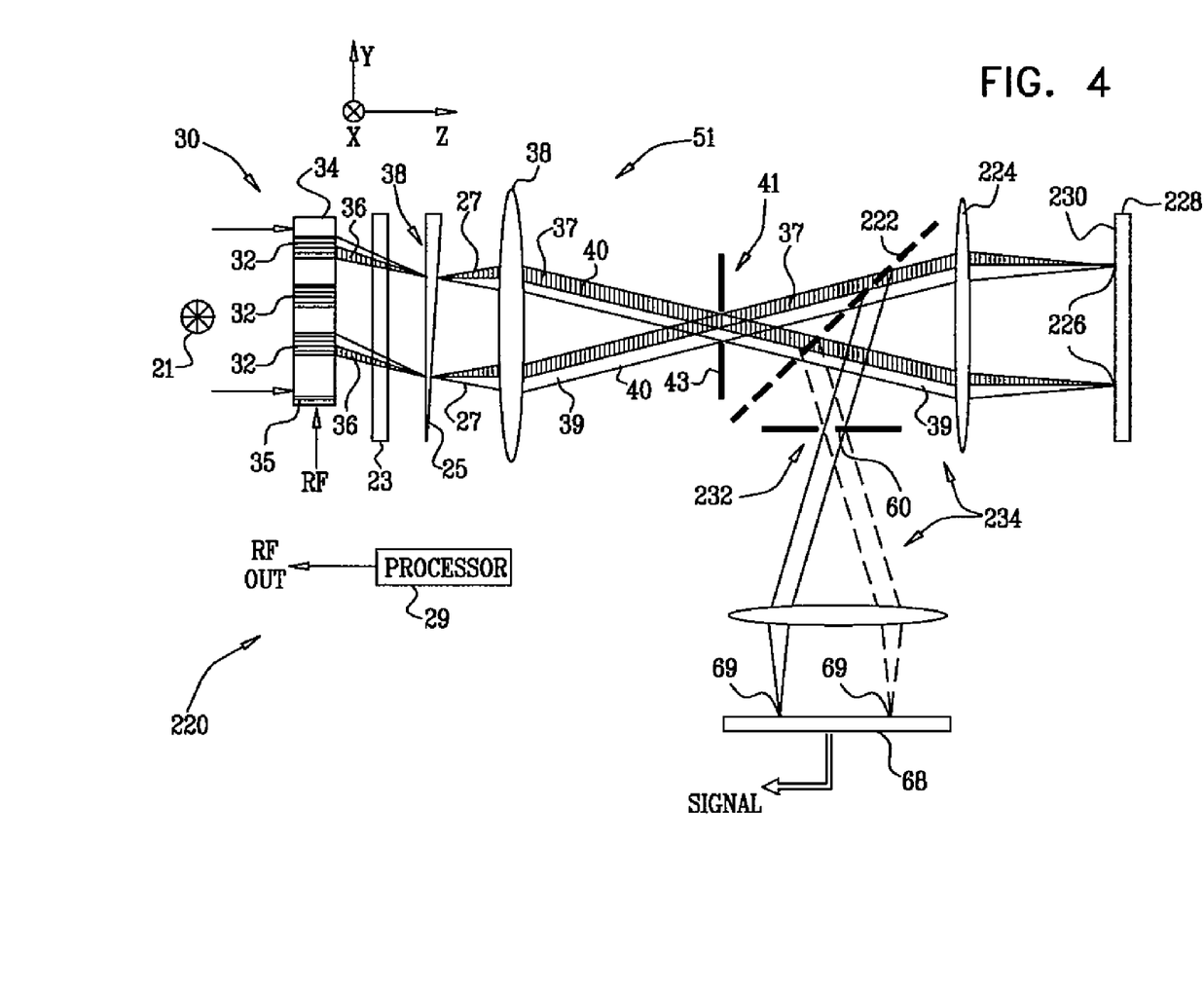
FIG. 4 is a schematic diagram of a reflection scanning microscope, according to an embodiment of the present invention.

FIG. 4 is a schematic diagram of a reflection scanning microscope 220, according to an embodiment of the present invention. Apart from the differences described below, the operation of microscope 220 is generally similar to that of microscope 20 (FIGS. 1, 2, and 3), and elements indicated by the same reference numerals in both microscopes 20 and 220 are generally similar in construction and in operation.

In microscope 220 a beamsplitter 222, typically a 50-50 beamsplitter, partially transmits beams 40 after they have traversed pupil 41. The partially transmitted beams are received by an objective 224. Objective 224 performs substantially the same functions as objective 44 by focusing beams 40 to a series of spots 226 on a surface 230 of an object 228 being inspected. Object 228 typically comprises a wafer. For clarity, in FIG. 4 only shaded sections 37 and unshaded sections 39 of transmitted beams 40 are illustrated. Returning radiation from surface 230 is collected by objective 224, which, together with beamsplitter 222, performs substantially the same functions as collection optics 54, forming collimated beams 234. Beamsplitter 222 reflects the returning collimated beams 234 so that the reflected collimated beams traverse an exit pupil 232. Exit pupil 232 corresponds to exit pupil 58, and is at the focal plane of objective 224.

Amplitude mask 60 is placed at exit pupil 232. Thus, as described above for collimated beams 56, focusing optics 66 form collimated beams 234 into focused spots 69 having amplitude changes corresponding to phase objects on surface 230. As is also described above, detector 68 and processor 29 generate an image of the phase objects in response to the amplitude changes.

Figure 5:
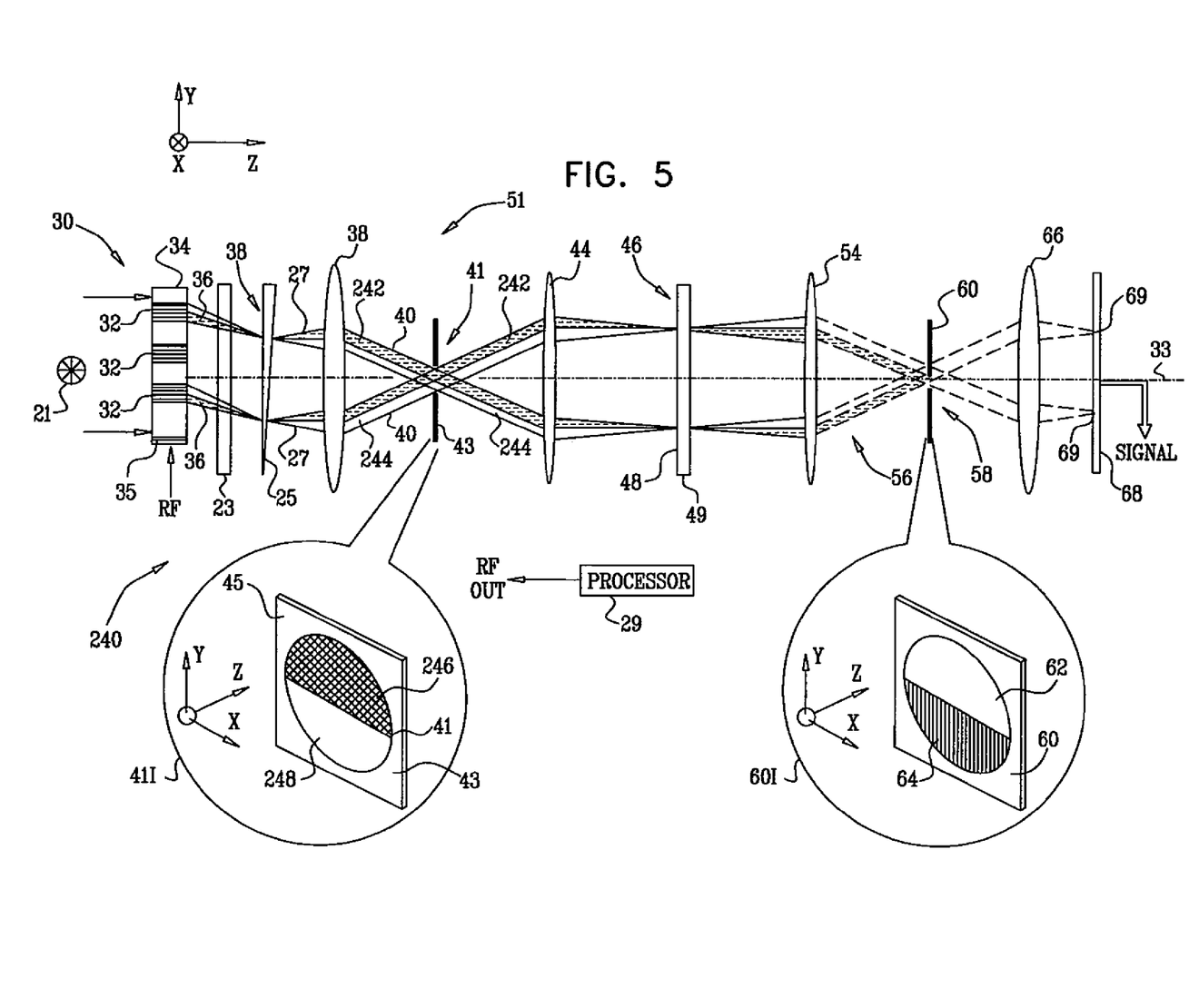
FIG. 5 is a schematic diagram of a transmission scanning microscope, according to an alternative embodiment of the present invention.
Figure 6:
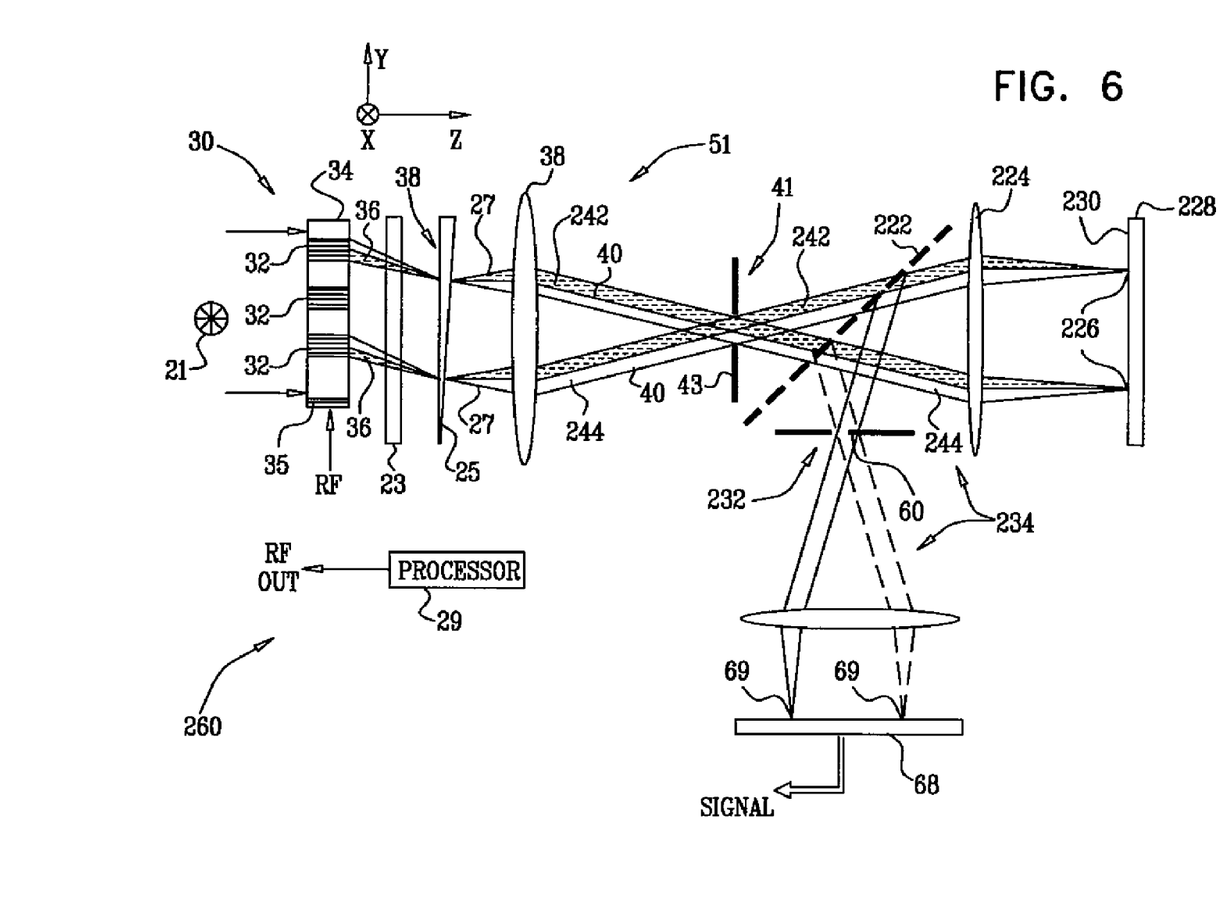
FIG. 6 is a schematic diagram of a reflection scanning microscope, according to an alternative embodiment of the present invention.

FIG. 5 is a schematic diagram of a transmission scanning microscope 240, and FIG. 6 is a schematic diagram of a reflection scanning microscope 260, according to embodiments of the present invention. Apart from the differences described below, the operation of microscope 240 is generally similar to that of microscope 20 (FIG. 1), and elements indicated by the same reference numerals in both microscopes 20 and 240 are generally similar in construction and in operation. Also, apart from the differences described below, the operation of microscope 260 is generally similar to that of microscope 220 (FIG. 4), and elements indicated by the same reference numerals in both microscopes 220 and 260 are generally similar in construction and in operation.

Unlike microscopes 20 and 220, the RF chirps input to AO element 34 of microscopes 240 and 260 do not have a phase change, but have one or more amplitude changes. Exemplary chirps, and the effect of the chirps on element 34, are illustrated in FIG. 7.

Figure 7:
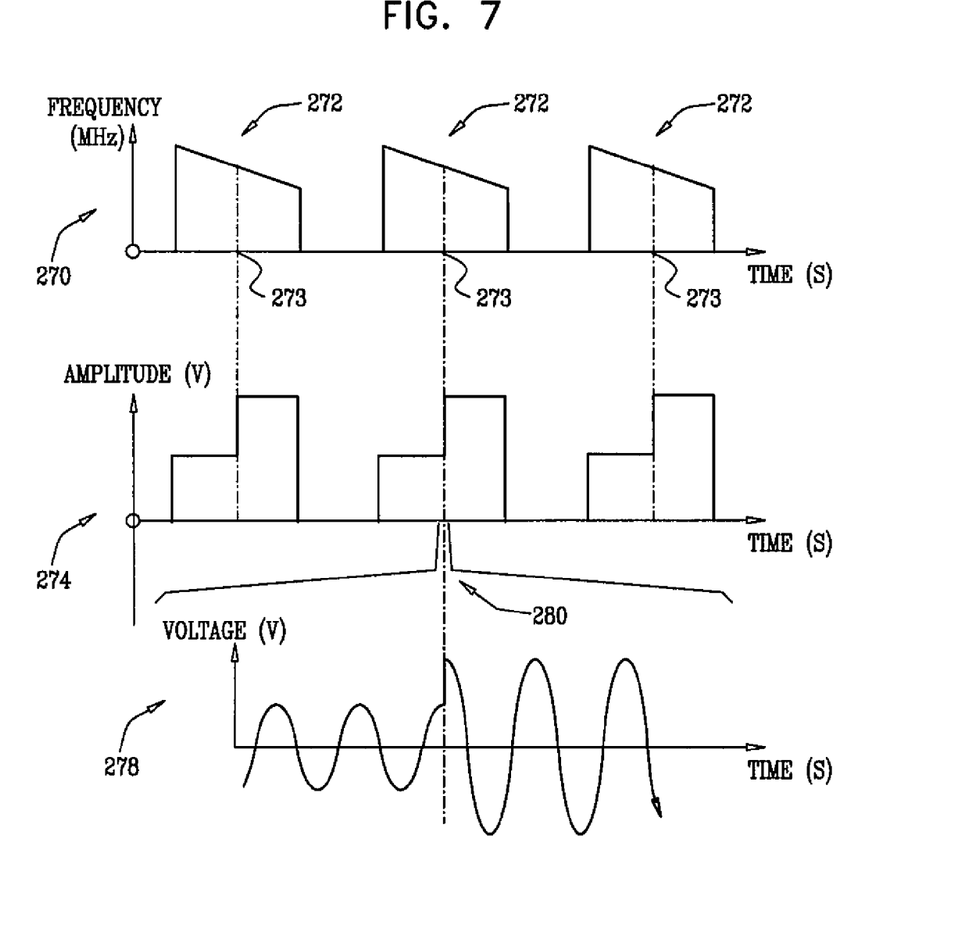
FIG. 7 shows schematic graphs of a radio-frequency signal generated for the microscopes of FIG. 5 and FIG. 6, according to an embodiment of the present invention.

FIG. 7 shows schematic graphs of the RF signal generated for microscopes 240 and 260 by processor 29, according to an embodiment of the present invention. The RF signal input to transducer 35 is in the form of chirps 272, which are generally similar to chirps 106 (FIG. 2). Graphs 270 and 274 are respective schematic frequency vs. time and amplitude vs. time graphs of the RF signal. As shown in the graphs, each chirp 272 has a generally linear change of frequency with time. Each chirp also has a temporal midpoint 273.

As shown by graph 274, for each chirp there is a change from a first substantially constant attenuated amplitude level to a second substantially constant non-attenuated amplitude level, at approximately midpoint 273 of the chirp. The attenuated amplitude level is approximately 50% of the non-attenuated level. It will be understood that the particular relationships and values given for graphs 270 and 274 are by way of illustration, and that the scope of the present invention comprises other relationships and values for chirps 272, such as a non-linear variation of the RF frequency with time, and an amplitude change other than a 50% reduction in amplitude.

A graph 278 is a schematic voltage vs. time graph of the RF signal, corresponding to a central section 280 of graphs 270 and 274. Graph 278 illustrates the effect of the amplitude changes for a given chirp 272, showing that there is an amplitude change but no phase change at midpoint 273.

Figure 8A:
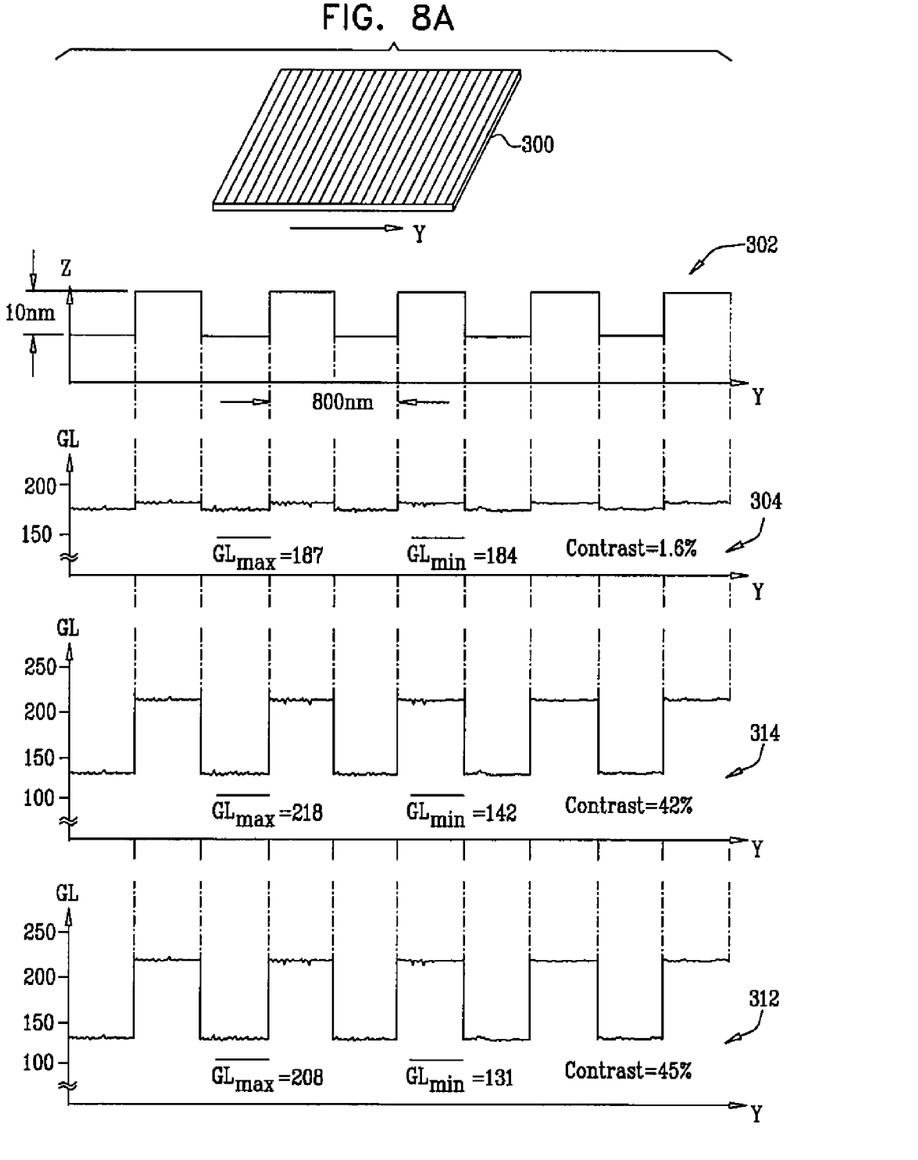
FIGS. 8A and 8B are schematic graphs illustrating results produced by the microscope of FIG. 4, according to an embodiment of the present invention.
Figure 8B:
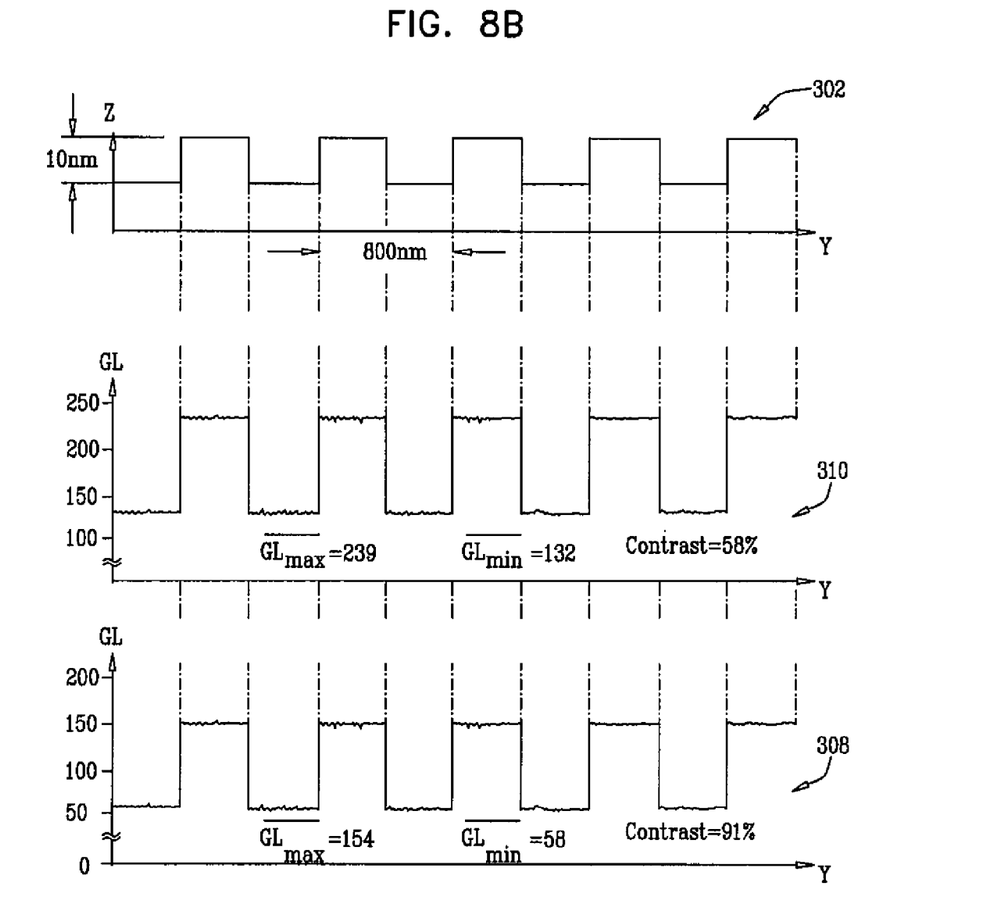

FIGS. 8A and 8B are schematic graphs illustrating results produced by microscope 220, according to an embodiment of the present invention. A test structure 300 was used as object 228 (FIG. 4). Structure 300 was a silicon wafer upon which a series of parallel lines were formed by removal of silicon from regions between the lines. The parallel lines had a height of approximately 10 nm and a period of approximately 800 nm. A graph 302 plots height vs. distance along the y-direction of test structure 300.

Structure 300 was imaged using dark field illumination and bright field illumination, by methods known in the art. In addition, four images of structure 300 were formed by microscope 220 using four different types of chirps. For one image the chirps were substantially as described above with reference to FIGS. 2 and 3. The other three images were formed using chirps having phase changes as shown in FIGS. 2 and 3, but instead of the 50% amplitude change described, the amplitude changes were 0%, 25%, and 80%. There were thus a total of six images.

Each image has lines with high gray levels and lines with low gray levels. To evaluate the images the high gray level lines were scanned in the x-direction, and an average high gray level value, $\overline{GL_{max}}$, was calculated for each image. Similarly, for each image an average low gray level value, $\overline{GL_{min}}$, was calculated by scanning the low gray level lines.

Graph 304 is illustrative of the bright field image results. The dark field image gave no measurable differences between high and low gray level lines, so no illustrative graph is given in FIG. 8A or 8B. Graphs 314, 312, 310, and 308 are illustrative of the four images generated using chirps respectively having 0%, 25%, 50%, and 80% amplitude change. The values of $\overline{GL_{max}}$ and $\overline{GL_{min}}$ are given in each graph as well as in Table I below. In addition, an image contrast, illustrative of the quality of the image, is given in each graph and in Table I. The image contrast is calculated according to expression (1):

$$\text{Contrast} = \frac{(\overline{GL_{max}} - \overline{GL_{min}})}{0.5(\overline{GL_{max}} + \overline{GL_{min}})} \quad (1)$$

TABLE I

| Image | Graph | Average Maximum Gray Level | Average Minimum Gray Level | Contrast |
|---|---|---|---|---|
| Bright Field | 304 | 187 | 184 | 1.6% |
| Phase Mask with 0% Amplitude Attenuation | 314 | 218 | 142 | 42% |
| Phase Mask with 25% Amplitude Attenuation | 312 | 208 | 131 | 45% |
| Phase Mask with 50% Amplitude Attenuation | 310 | 239 | 132 | 58% |
| Phase Mask with 80% Amplitude Attenuation | 308 | 154 | 58 | 91% |

Inspection of the graphs of FIGS. 8A and 8B, and of Table I, shows that the parallel lines of test structure 300 are substantially invisible using bright field non-phase contrast systems. However, graphs 308, 310, 312 and 314 all illustrate that using a composite one-dimensional traveling wave incorporating a phase or phase and amplitude mask makes the phase object lines of the test structure visible, and produces a very good record of the lines. The inventors have also found that using composite one-dimensional traveling waves incorporating only amplitude masks, such as are used in microscopes 240 and 260, may significantly enhance the visibility of phase and/or amplitude objects being inspected.

The characteristics of a specific 1D composite traveling lens 32 (FIGS. 1, 4, 5, 6) are generated by the RF chirp input to AO element 34. The characteristics include a focal length of the lens, an amplitude attenuation incorporated into the beam traversing the composite lens, and a phase shift incorporated into the beam. An example of a 50% amplitude attenuation and a phase shift of $$+\frac{\pi}{2},$$

each applied to half the lens, has been described above with respect to FIGS. 2 and 3. An example of a lens having no phase shift and a 50% amplitude attenuation applied to half the lens has been described with respect to FIG. 7. Since the characteristics of the lens are dependent on the characteristics of the RF chirp, both the amplitude attenuation and/or the phase shift for each composite lens may be altered, substantially at will, by processor 29, typically under direction of an operator of microscopes 20, 220, 240, or 260. Examples of further alternative lenses are described below with reference to FIG. 9.

Figure 9:
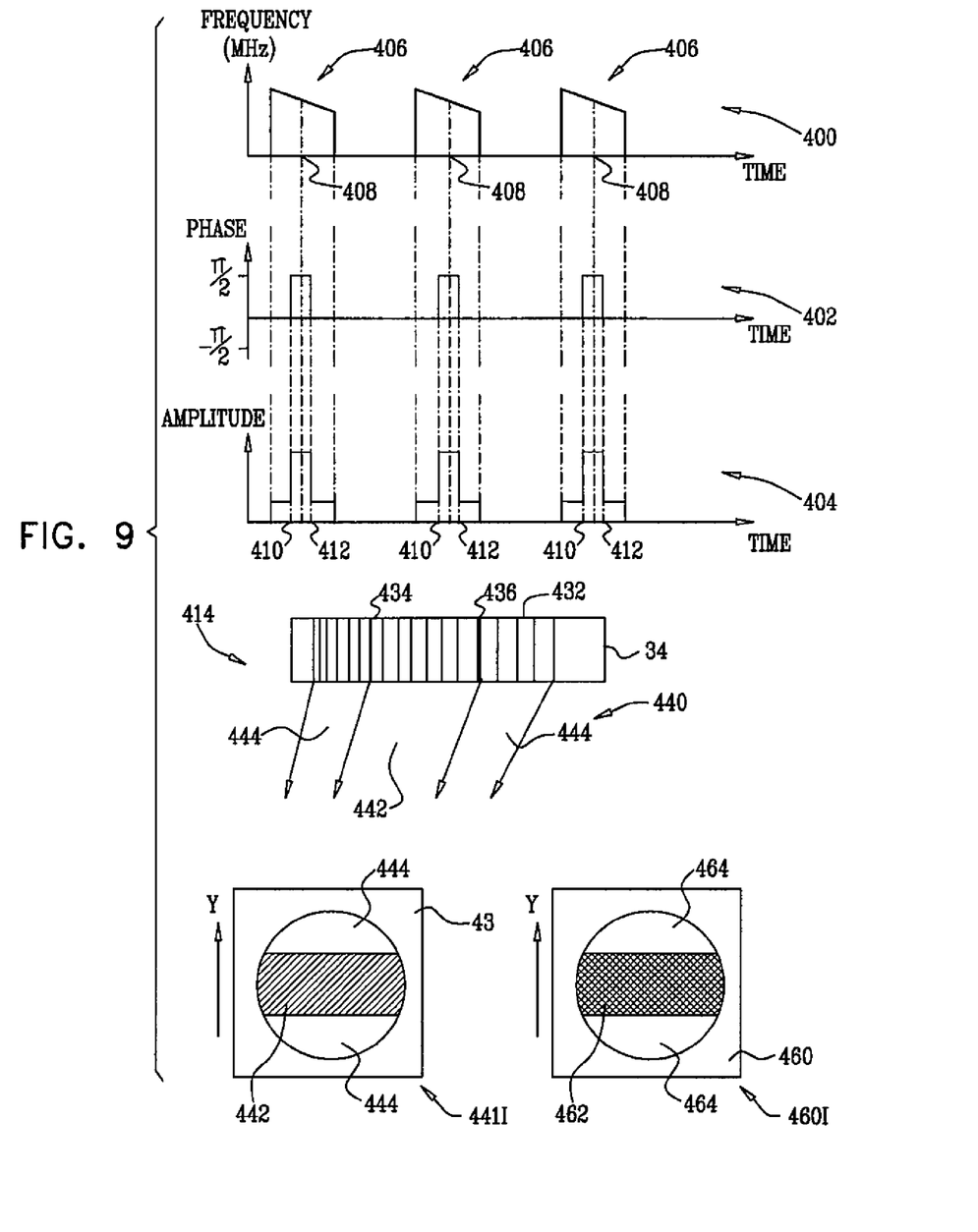
FIG. 9 is a schematic diagram illustrating a composite traveling lens in the acousto-optic element of the microscope of FIG. 1, according to an embodiment of the present invention.

FIG. 9 is a schematic diagram illustrating an alternative 1D composite traveling lens in AO element 34, according to an embodiment of the present invention. Graphs 400, 402, and 404 are respective schematic frequency vs. time, phase vs. time, and amplitude vs. time, graphs of an RF signal producing chirps 406. Graph 400 is generally similar to graph 100 (FIG. 2), chirps 406 having temporal midpoints 408. However, graph 402 shows that there is a phase shift of $$+\frac{\pi}{2}$$

applied to a central portion of the traveling lenses produced by chirps 406, between times 410 and 412 that are approximately symmetrical with respect to midpoints 408. Also there is an attenuation of approximately 75% in amplitude produced on either side of a non-attenuated central portion, before time 410 and after time 412. As illustrated schematically in a diagram 414, each chirp 406 produces a 1D composite traveling lens 432 in AO element 34, the traveling lens having two phase shifts and two amplitude changes at positions 434 and 436 along the lens. Positions 434 and 436 correspond with times 410 and 412, and are typically approximately symmetrically disposed about the midpoint of lens 432.

In microscopes 20 and 220 (FIGS. 1 and 4), each traveling lens 432 produces a composite 1D beam 440, which at pupil 41 has a cross-section shown by inset 441I. Each beam 440 is divided into three sections: a central section 442 where the beam is phase shifted and is un-attenuated, and two generally similar sections 444 where the beam is attenuated with no phase shift.

An amplitude mask 460, shown in inset 460I, is placed at exit pupils 58 and 232. Amplitude mask has three amplitude sections corresponding with the three phase sections of beams 440: an opaque central section 462, and two transparent sections 464.

As is explained above with respect to FIGS. 1-5, composite beams substantially similar to composite 1D beam 440 generate amplitude changes for phase objects on either a substantially transparent object (microscope 20) or on a substantially opaque object (microscope 220).

Chirps having only amplitude changes, or chirps having only phase changes, rather than chirps 406 which have a combination of phase and amplitude changes, may be generated by forming chirps which have no phase change or chirps which have no amplitude change. For example, processor 29 may generate no-phase-change chirps by forming an RF signal which has frequency vs. time and amplitude vs. time graphs similar to graphs 400 and 404, but which instead of the phase vs. time graph 402, the phase vs. time graph of the RF signal is a horizontal straight line, showing no change of phase during the chirp.

Such no-phase-change chirps may be used in microscopes 240 and 260. For no-phase-change chirps having frequency vs. time and amplitude vs. time graphs similar to graphs 400 and 404, amplitude mask 460 may be used.

As is illustrated by the examples described above, by generating 1D composite traveling lenses using chirps, composite beams may be generated which have substantially any amplitude change across the beam, as well as any phase change across the beam. The different composite beams may be generated by processor 29 incorporating corresponding amplitude and/or phase changes into the chirp. In addition, since a specific composite beam is formed from a specific composite lens, more than one type of composite beam may be generated sequentially and effectively simultaneously in AO element 34. For example, for microscope 20 (FIG. 1), AO element 34 may have three composite traveling lenses present simultaneously in the element, a first lens as described above for the microscope, a second lens with a phase shift of $$+\frac{\pi}{4},$$

and a third lens similar to the first lens but with an amplitude attenuation of 80%.

Figure 10:
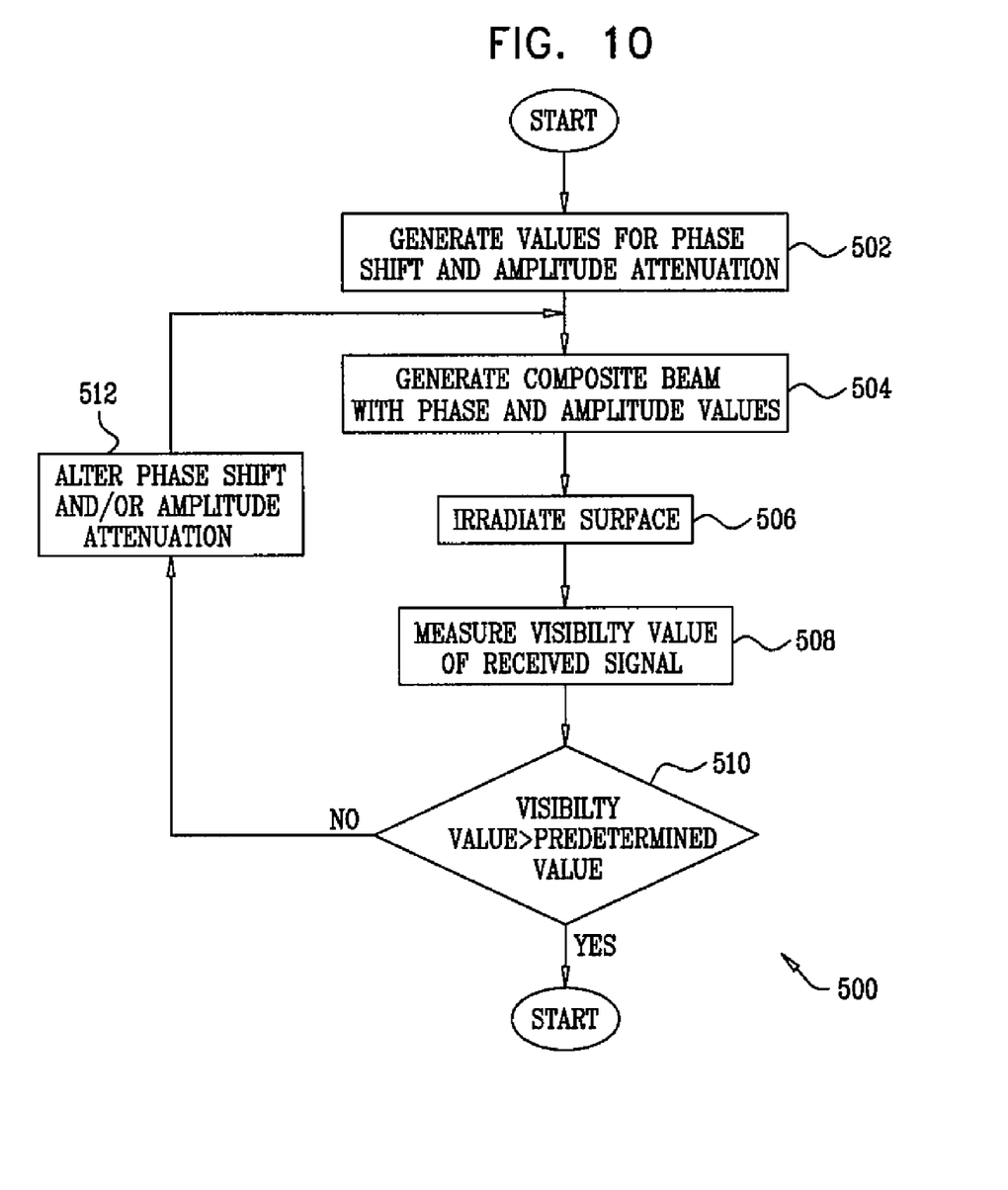
FIG. 10 is a flowchart of a method for optimizing an image of a surface, using changes in phase shift and/or amplitude attenuation of a composite traveling lens, according to an embodiment of the present invention.

FIG. 10 is a flowchart 500 of a method for optimizing an image of a surface, according to an embodiment of the present invention. By way of example, the method of flowchart 500 is assumed to be applied iteratively for microscope 20 (FIG. 1) or for microscope 260. Typically the method is implemented by processor 29, under overall control of an operator of the microscopes.

In a first step 502 the operator provides values of the phase shift and/or amplitude attenuation to be applied to chirps 106 (FIG. 2) by processor 29. In a second step 504 the processor applies the values to produce the chirps, and excites transducer 35 with the chirps. The processor also operates source 21 so as to produce beams 36. In a third step 506 surface 48 or surface 230 is irradiated, substantially as described above with reference to FIGS. 1 and 6.

In a fourth step 508 processor 29 analyzes the signal generated by detector 68, and determines a visibility of an object on a surface being inspected by calculating a numerical visibility value from the signal. The numerical value may typically be formed by measurements of contrast, such as is described above with respect to Table I. Alternatively, any other convenient measurement of visibility may be used, such as a function using standard deviation and/or noise of the measured gray levels, a modulation transfer function (MTF), and/or derivatives of these parameters.

In a comparison step 510 the processor compares the numerical visibility value with a predetermined value that has been provided to the processor by the microscope operator. Alternatively or additionally the predetermined value is a value that the processor has calculated for a prior iteration of flowchart 500.

If the comparison returns a false value, then in a chirp parameter alteration step 512 the processor changes the phase shift and/or the amplitude attenuation values set in step 502. Typically the changes are performed incrementally, for example, a phase shift θ may be changed by $$\frac{\pi}{4}$$

or less, within a range —$\pi \leq \theta \leq \pi$, and an amplitude A may be changed by 10% or less, within a range $0\% \leq A \leq 100\%$. If the comparison in step 510 returns a true value, flowchart 500 ends.

The embodiments described above have assumed that amplitude masks 60 and 460, positioned at exit pupils 58 and 232, are substantially static. Thus mask 60 comprises a low transmission semicircle 64 and a high transmission semicircle 62, which are spatially fixed and which have fixed transmission properties: 0% for the low transmission semicircle, 100% for the high transmission semicircle. Mask 460 comprises three spatially fixed sections of a circle: a central low transmission section 462 which has 0% transmission, and two substantially similar high transmission sections 464 which have 100% transmission. However, it will be understood that amplitude mask 60 and 460 may be constructed so that the sections from which they are formed are dynamic in spatial properties and/or in transmission properties, and that the transmission may not necessarily be 0% or 100%.

Such a dynamic amplitude mask, for example, may be constructed from an LCD (liquid crystal display) array, using an appropriate choice of operating wavelength for source 21, the LCD display advantageously being operated by processor 29. Processor 29 may adjust the spatial distribution of low transmission and high transmission elements of the array, as well as the percentage transmission of the elements. It will be understood that the spatial distribution of the low and high transmission elements, and the spatial distribution of the phase variation at pupil 43, should correspond. Other methods for producing dynamic amplitude masks, such as using MEMS (micro electromechanical systems), may be applied, changing elements of microscopes 20, 220, 240, or 260 as necessary.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

We claim:

1. A method for imaging a surface, comprising:
generating a traveling lens in an acousto-optic material;
incorporating a traveling mask into a portion of the traveling lens so as to produce a composite traveling lens;
irradiating the composite traveling lens so as to produce a composite focused beam having a spatial variation across the composite focused beam;
directing the composite focused beam onto a region of the surface so as to generate radiation characteristic of the region therefrom; and
imaging the radiation onto a detector so as to generate, responsively to the spatial variation of the composite focused beam, a signal characteristic of the region,
wherein generating the traveling lens comprises generating a radio-frequency (RF) pulse having a variable frequency, and wherein incorporating the traveling mask comprises incorporating a step function change in at least one of a phase and an amplitude of the RF pulse, and exciting a transducer coupled to the acoustic-optic material with the RF pulse.

2. The method according to claim 1, wherein the traveling mask comprises a traveling phase mask, wherein the spatial variation of the composite focused beam comprises a spatial phase variation, and wherein generating the signal characteristic of the region comprises generating the signal responsively to the spatial phase variation of the composite focused beam.

3. The method according to claim 1, wherein the traveling mask comprises a traveling amplitude mask, wherein the spatial variation of the composite focused beam comprises a spatial amplitude variation, and wherein generating the signal characteristic of the region comprises generating the signal responsively to the spatial amplitude variation of the composite focused beam.

4. The method according to claim 1, further comprising collecting and conveying the composite focused beam as a collimated beam through a pupil of one or more optical elements.

5. The method according to claim 1, further comprising collecting and conveying the radiation through a pupil of one or more optical elements.

6. The method according to claim 1, wherein irradiating the composite traveling lens comprises irradiating the composite traveling lens with coherent radiation.

7. The method according to claim 1, wherein the spatial variation of the composite focused beam comprises a spatial step-function variation, and wherein generating the signal characteristic of the region comprises generating the signal responsively to the spatial step-function variation of the composite focused beam.

8. The method according to claim 1, wherein the region comprises one or more amplitude objects, and wherein the signal characteristic of the region is further characteristic of the one or more amplitude objects.

9. The method according to claim 1, wherein the region comprises one or more phase objects, and wherein the signal characteristic of the region is further characteristic of the one or more phase objects.

10. The method according to claim 1, wherein generating the signal characteristic of the region comprises performing a measurement in response to a visibility of an object at the region, and iteratively varying a parameter of the traveling mask in response to the measurement.

11. The method according to claim 1, wherein generating the radiation characteristic of the region comprises generating the radiation by transmission of the composite focused beam through the surface.

12. The method according to claim 1, wherein generating the radiation characteristic of the region comprises generating the radiation by reflection of the composite focused beam from the surface.

13. The method according to claim 2, wherein the traveling mask further comprises a traveling amplitude mask, wherein the spatial variation of the composite focused beam further comprises a spatial amplitude variation, and wherein generating the signal characteristic of the region further comprises generating the signal responsively to the spatial phase variation and the spatial amplitude variation of the composite focused beam.

14. The method according to claim 4, wherein the composite focused beam travels in response to the traveling lens, and wherein the pupil is fixed relative to the acousto-optic material.

15. The method according to claim 4, wherein imaging the radiation onto the detector comprises imaging the radiation onto the detector via an amplitude mask, located at a second pupil, having a spatial amplitude variation corresponding to a spatial variation of the composite focused beam measured across a first pupil.

16. The method according to claim 15, wherein the amplitude mask comprises a static mask.

17. The method according to claim 15, wherein the amplitude mask comprises a dynamic mask.

18. The method according to claim 5, wherein the radiation travels in response to the traveling lens, and wherein the pupil is fixed relative to the acousto-optic material.

19. Apparatus for imaging a surface, comprising:
an acousto-optic (AO) material;

a processor configured to generate a traveling lens in the AO material and to incorporate a traveling mask into a portion of the traveling lens so as to produce a composite traveling lens;

a radiation source arranged to irradiate the composite traveling lens so as to produce a composite focused beam having a spatial variation across the composite focused beam;

optical elements configured to direct the composite focused beam onto a region of the surface so as to generate radiation characteristic of the region therefrom;

a detector arranged to image the radiation so as to generate, responsively to the spatial variation of the composite focused beam, a signal characteristic of the region; and a transducer coupled to the AO material, wherein the processor is configured to generate a radio-frequency (RF) pulse having a variable frequency so as to generate the traveling lens, and to incorporate a step function change in at least one of a phase and an amplitude of the RE pulse, and to excite the transducer with the RF pulse.

20. The apparatus according to claim 19, wherein the traveling mask comprises a traveling phase mask, wherein the spatial variation of the composite focused beam comprises a spatial phase variation, and wherein generating the signal characteristic of the region comprises generating the signal responsively to the spatial phase variation of the composite focused beam.

21. The apparatus according to claim 19, wherein the traveling mask comprises a traveling amplitude mask, wherein the spatial variation of the composite focused beam comprises a spatial amplitude variation, and wherein generating the signal characteristic of the region comprises generating the signal responsively to the spatial amplitude variation of the composite focused beam.

22. The apparatus according to claim 19, wherein the optical elements comprise a pupil, and wherein the optical elements are configured to collect and convey the composite focused beam as a collimated beam through the pupil.

23. The apparatus according to claim 19, wherein the optical elements comprise a pupil, and wherein the optical elements are configured to collect and convey the radiation through the pupil.

24. The apparatus according to claim 19, wherein the radiation source irradiates the composite traveling lens with coherent radiation.

25. The apparatus according to claim 19, wherein the spatial variation of the composite focused beam comprises a spatial step-function variation, and wherein generating the signal characteristic of the region comprises generating the signal responsively to the spatial step-function variation of the composite focused beam.

26. The apparatus according to claim 19, wherein the region comprises one or more amplitude objects, and wherein the signal characteristic of the region is further characteristic of the one or more amplitude objects.

27. The apparatus according to claim 19, wherein the region comprises one or more phase objects, and wherein the signal characteristic of the region is further characteristic of the one or more phase objects.

28. The apparatus according to claim 19, wherein the processor is configured to perform a measurement of the signal characteristic of the region in response to a visibility of an object at the region, and to iteratively vary a parameter of the traveling mask in response to the measurement.

29. The apparatus according to claim 19, wherein the optical elements are configured to generate the radiation characteristic of the region by transmission of the composite focused beam through the surface.

30. The apparatus according to claim 19, wherein the optical elements are configured to generate the radiation characteristic of the region by reflection of the composite focused beam from the surface.

31. The apparatus according to claim 20, wherein the traveling mask further comprises a traveling amplitude mask, wherein the spatial variation of the composite focused beam further comprises a spatial amplitude variation, and wherein generating the signal characteristic of the region further comprises generating the signal responsively to the spatial phase variation and the spatial amplitude variation of the composite focused beam.

32. The apparatus according to claim 22, wherein the composite focused beam travels in response to the traveling lens, and wherein the pupil is faxed relative to the acousto-optic material.

33. The apparatus according to claim 32, further comprising an amplitude mask, located at a second pupil, having a spatial amplitude variation corresponding to a spatial variation of the composite focused beam measured across a first pupil, wherein the detector is configured to image the radiation via the amplitude mask.

34. The apparatus according to claim 33, wherein the amplitude mask comprises a static mask.

35. The apparatus according to claim 33, wherein the amplitude mask comprises a dynamic mask.

36. The apparatus according to claim 23, wherein the radiation travels in response to the traveling lens, and wherein the pupil is fixed relative to the acousto-optic material.

* * * * *